(12) United States Patent
Cerimeli et al.

(10) Patent No.: US 11,325,466 B2
(45) Date of Patent: May 10, 2022

(54) APPARATUS FOR DRIVE SHAFT EXTENSION

(71) Applicants: Dean Cerimeli, Gilbert, AZ (US);
Robert A Dolan, Mesa, AZ (US);
Michael H Dilgard, Tempe, AZ (US);
Javier Nolasco, Phoenix, AZ (US);
Jeremy Donohue, Gilbert, AZ (US)

(72) Inventors: Dean Cerimeli, Gilbert, AZ (US);
Robert A Dolan, Mesa, AZ (US);
Michael H Dilgard, Tempe, AZ (US);
Javier Nolasco, Phoenix, AZ (US);
Jeremy Donohue, Gilbert, AZ (US)

(73) Assignee: U-HAUL INTERNATIONAL, INC., Phoenix, AZ (US)

( * ) Notice: Subject to any disclaimer, the term of this patent is extended or adjusted under 35 U.S.C. 154(b) by 0 days.

(21) Appl. No.: 15/018,007

(22) Filed: Feb. 8, 2016

(65) Prior Publication Data

US 2016/0152136 A1 Jun. 2, 2016

Related U.S. Application Data

(62) Division of application No. 14/091,825, filed on Nov. 27, 2013, now Pat. No. 9,283,842.

(60) Provisional application No. 61/731,384, filed on Nov. 29, 2012.

(51) Int. Cl.
*B60K 17/22* (2006.01)
*B60K 17/24* (2006.01)
*F16C 3/02* (2006.01)

(52) U.S. Cl.
CPC .............. *B60K 17/22* (2013.01); *B60K 17/24* (2013.01); *F16C 3/02* (2013.01); *Y10T 29/49622* (2015.01)

(58) Field of Classification Search
CPC ..... B60K 17/22; F16C 3/02; Y10T 29/49616; Y10T 29/49622
See application file for complete search history.

(56) References Cited

U.S. PATENT DOCUMENTS 1,243,864 A * 10/1917 Olson .................... B60K 17/22
180/380
1,535,880 A * 4/1925 Westmoreland ....... B62D 21/14
180/380

* cited by examiner

*Primary Examiner* — Rick K Chang
(74) *Attorney, Agent, or Firm* — Richard E. Oney; Venjuris, P.C.

(57) ABSTRACT

A method and apparatus are provided for extending the length of a vehicle without the need to rebalance the original drive assembly. The method includes disconnecting the front drive shaft segment from the vehicle transmission, extending the length of the vehicle frame, and inserting a drive shaft extension segment which includes: a rigid tubular shaft rotatable about a longitudinal axis; a universal joint mounted at the tubular shaft front end and having a front flange configured for mounting to the transmission; and a bearing assembly mounted to the tubular shaft The extension segment rear end includes a rearward facing flange configured for mounting to a forward facing flange of the front drive shaft segment that was disconnected from the vehicle transmission. The extension segment is installed in the vehicle between the vehicle transmission and the front drive shaft segment without the need to rebalance the original drive assembly.

17 Claims, 16 Drawing Sheets

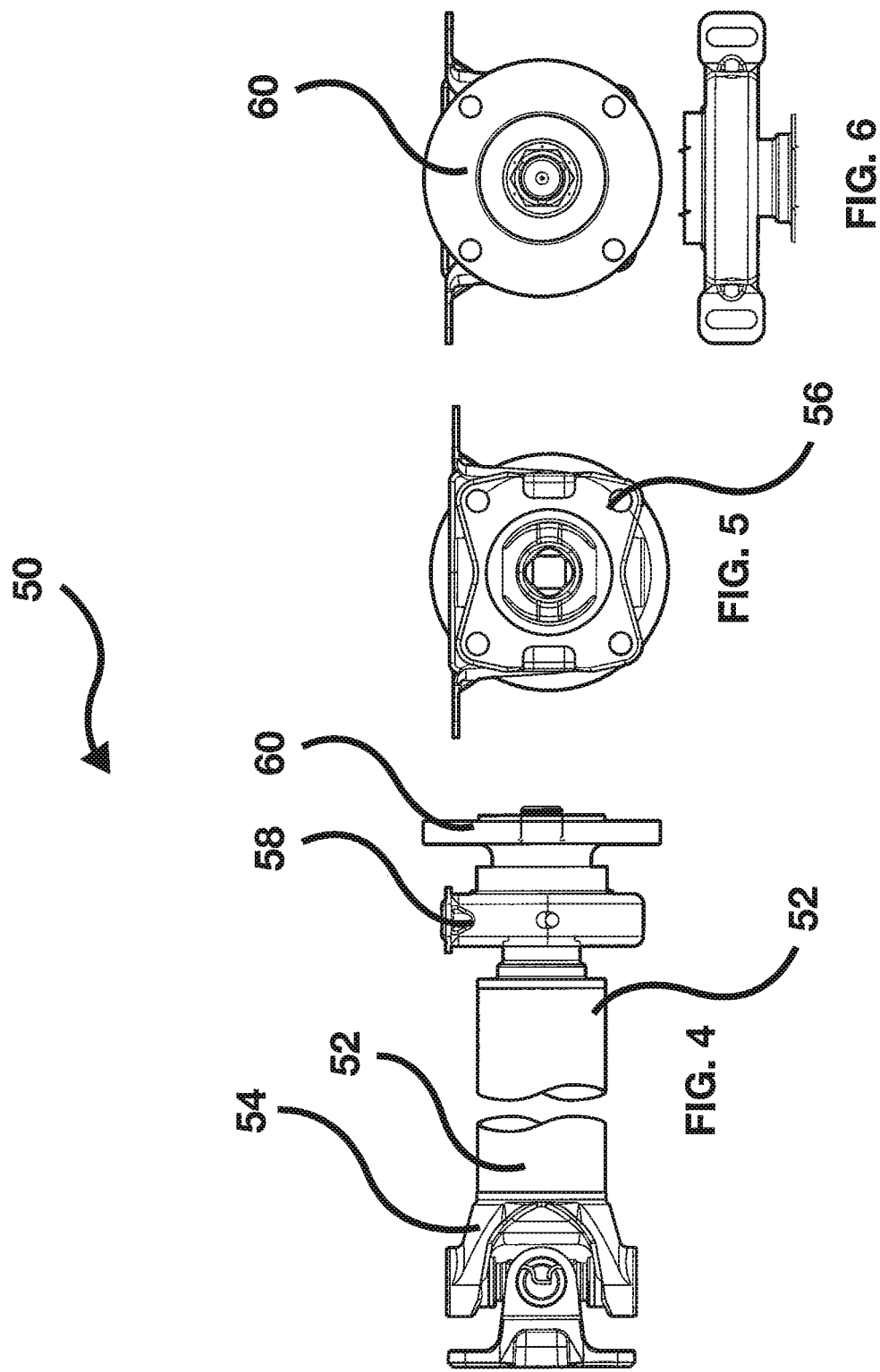

APPARATUS FOR DRIVE SHAFT EXTENSION

RELATED APPLICATION

This application is a divisional of and claims the priority of U.S. non-provisional patent application Ser. No. 14/091,825, filed Nov. 27, 2013, entitled "Method and Apparatus for Drive Shaft Extension," which is incorporated herein by reference. This application claims priority of, and incorporates herein by reference, U.S. Provisional Application No. 61/731,384, filed Nov. 29, 2012, entitled "Method and Apparatus for Drive Shaft Extension."

BACKGROUND

This invention relates generally to motor vehicle frame and drive shaft extensions. More particularly, it relates to a method and apparatus for extending the length of a vehicle chassis and drive shaft without having to rebalance the lengthened drive shaft assembly.

It is frequently desired to lengthen a vehicle chassis, such as a truck chassis. This requires a corresponding extension of the driving mechanism, typically by adding a section to the drive shaft. Previously, however, such extended drive shaft assemblies have required rebalancing the entire assembly after the extension is added, resulting in additional time, labor and expense.

It is an object of the present invention to provide a method and apparatus for extending the length of a vehicle chassis and drive shaft without the need to rebalance the lengthened drive shaft assembly.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, there is provided a drive shaft extension segment for installation into a vehicle to be extended in length. The drive shaft extension segment includes: a rigid tubular shaft rotatable about a longitudinal axis; and a universal joint mounted at the tubular shaft front end and having a front flange configured for mounting to a transmission. The tubular shaft rear end includes a rearward facing flange configured for mounting to a forward facing flange of a drive assembly that has been disengaged from a transmission of the vehicle to be extended in length. A bearing assembly is rotatably mounted to the tubular shaft between the shaft front end and rear end.

In one embodiment, the drive shaft extension segment can be mounted to an extension cross-member configured to support the drive shaft extension segment so that the longitudinal axis of the extension segment tubular shaft is in a generally straight alignment with a longitudinal axis of the drive assembly when the drive shaft extension segment is mounted to the drive assembly.

To help reduce the problem of runout tolerance and thereby help eliminate the need to rebalance the drive shaft assembly after it is assembled with the drive shaft extension segment, the disengaged drive assembly can include a rear segment having an enlarged shaft diameter. For example, in one specific embodiment, the vehicle to be extended in length has an original wheel base of about 158 inches and the drive shaft extension segment has a length of about 44 inches. The disengaged drive assembly includes a forward segment having a shaft diameter of about 2½ inches and rear segment having a larger shaft diameter in a range of between about 3 inches to about 3½ inches.

A method according to the invention is useful for extending the length of an original drive assembly in a vehicle having a frame, wherein the original drive assembly has a front drive shaft segment coupled to a transmission of the vehicle and a rear drive shaft segment coupled to a rear differential assembly of the vehicle. The method includes disconnecting the front drive shaft segment from the transmission, extending the length of the vehicle frame, and providing a drive shaft extension segment. The drive shaft extension segment includes: a rigid tubular shaft rotatable about a longitudinal axis and having a front end and a rear end; a universal joint mounted at the tubular shaft front end and having a front flange configured for mounting to the transmission; and a bearing assembly mounted to the tubular shaft between the front end and the rear end. The tubular shaft rear end includes a rearward facing flange configured for mounting to a forward facing flange of the front drive shaft segment. The drive shaft extension segment is installed in the vehicle between the vehicle transmission and the front drive shaft segment without rebalancing the original drive assembly.

BRIEF DESCRIPTION OF THE DRAWINGS

The accompanying drawings, which are incorporated in and constitute a part of the specification, illustrate the presently preferred embodiments and methods of the invention and, together with the general description given above and the detailed description of the preferred embodiments and methods given below, serve to explain the principles of the invention.

FIG. 4 is a side elevation view of the drive shaft extension assembly of FIG. 3.

FIG. 5 is an end elevation view showing the front end of the drive shaft extension assembly of FIG. 3.

FIG. 6 is an end elevation view and a bottom plan view showing the rear end of the drive shaft extension assembly of FIG. 3.

DESCRIPTION

Figure 1:
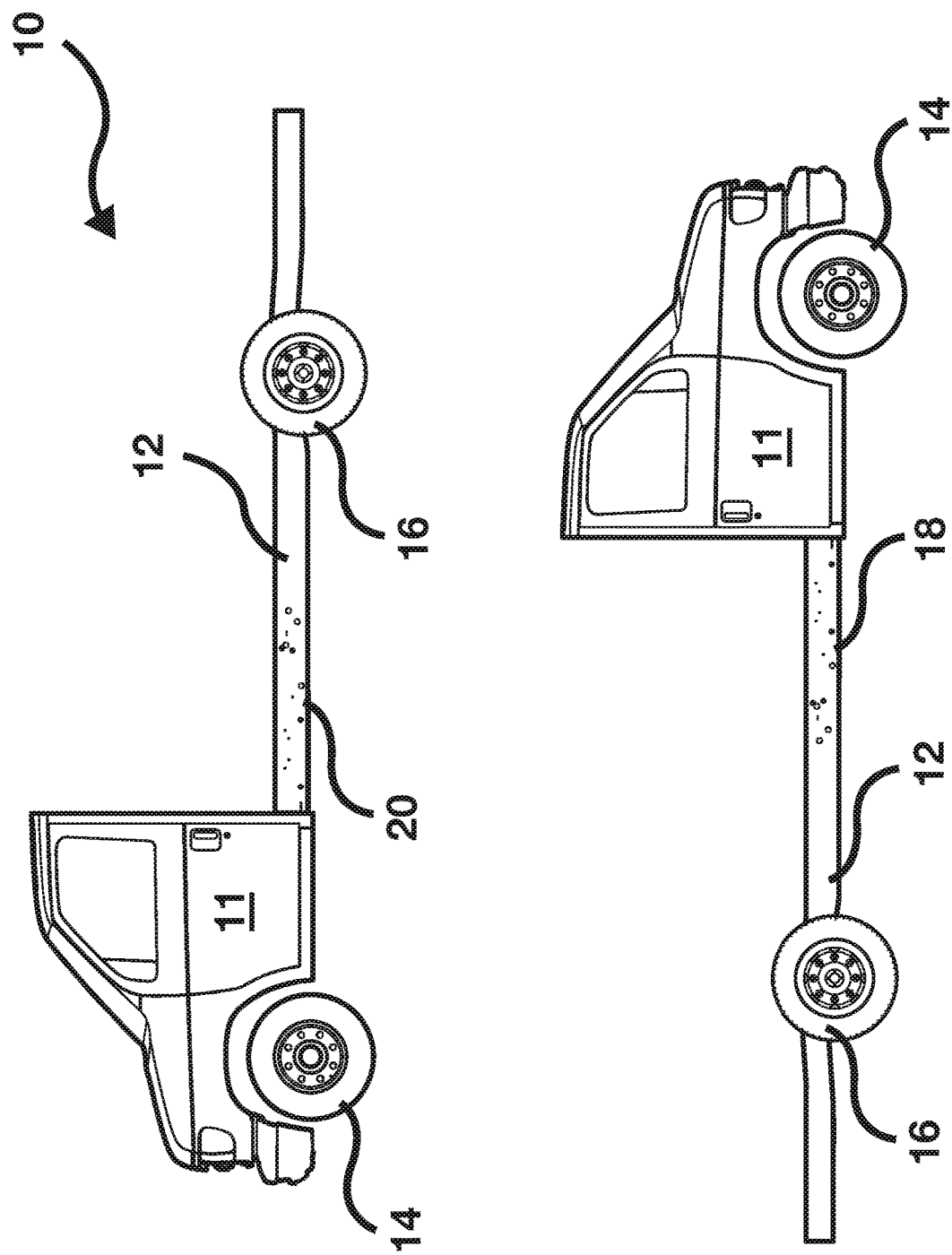
FIG. 1 shows left and right side elevation views of a Ford E450 truck before having its chassis extended using the method and apparatus of the present invention.

Reference in this application is made to presently preferred embodiments of the invention. While the invention is described more fully with reference to these examples, the invention in its broader aspects is not limited to the specific details, representative devices, and illustrative examples shown and described. Rather, the description is to be understood as a broad, teaching disclosure directed to persons of ordinary skill in the appropriate arts, and not as limiting upon the invention.

FIGS. 1 and 7-9 show a Ford E450 truck chassis before being extended using the method and apparatus of the present invention. Referring generally to the figures, a truck 10 includes a cab 11, a frame 12 that is mounted by a suspension (not shown) to a set of front wheels 14, and a set of driven rear wheels 16. The frame 12 includes a pair of elongated rigid frame rails 18, 20 that extend in parallel from the front of the vehicle to the rear. A front cross-member 24 and a rear cross-member 25 each span between the frame rails 18, 20 (see FIG. 7). Each cross member 24, 25 is perpendicular to the rails 18, 20 and parallel to the other cross member. An engine (not shown) is mounted at the front of the frame 12, with a transmission 22 (shown in FIG. 8) attached to the rear of the engine. A drive shaft assembly 26 (shown in FIG. 7) extends rearwardly from the transmission 22 to a differential 30 (shown in FIG. 9) between the rear wheels 16 to transmit power to the wheels.

Figure 7:
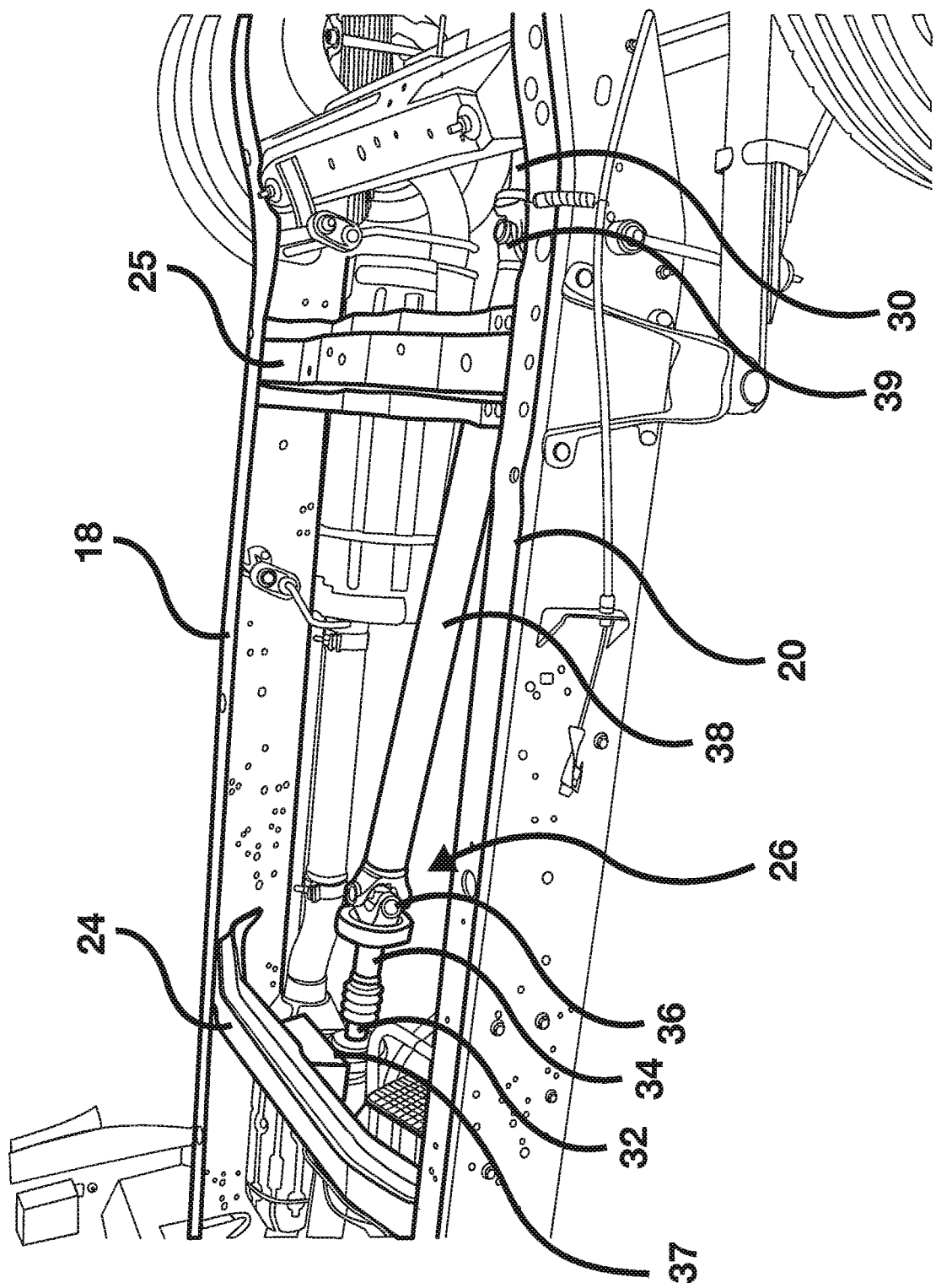
FIG. 7 shows a portion of the drive shaft assembly of the vehicle of FIG. 1, including the universal joint connection between the front drive shaft segment and the rear drive shaft segment, before the drive shaft is extended using the method and apparatus of the present invention.
Figure 8:
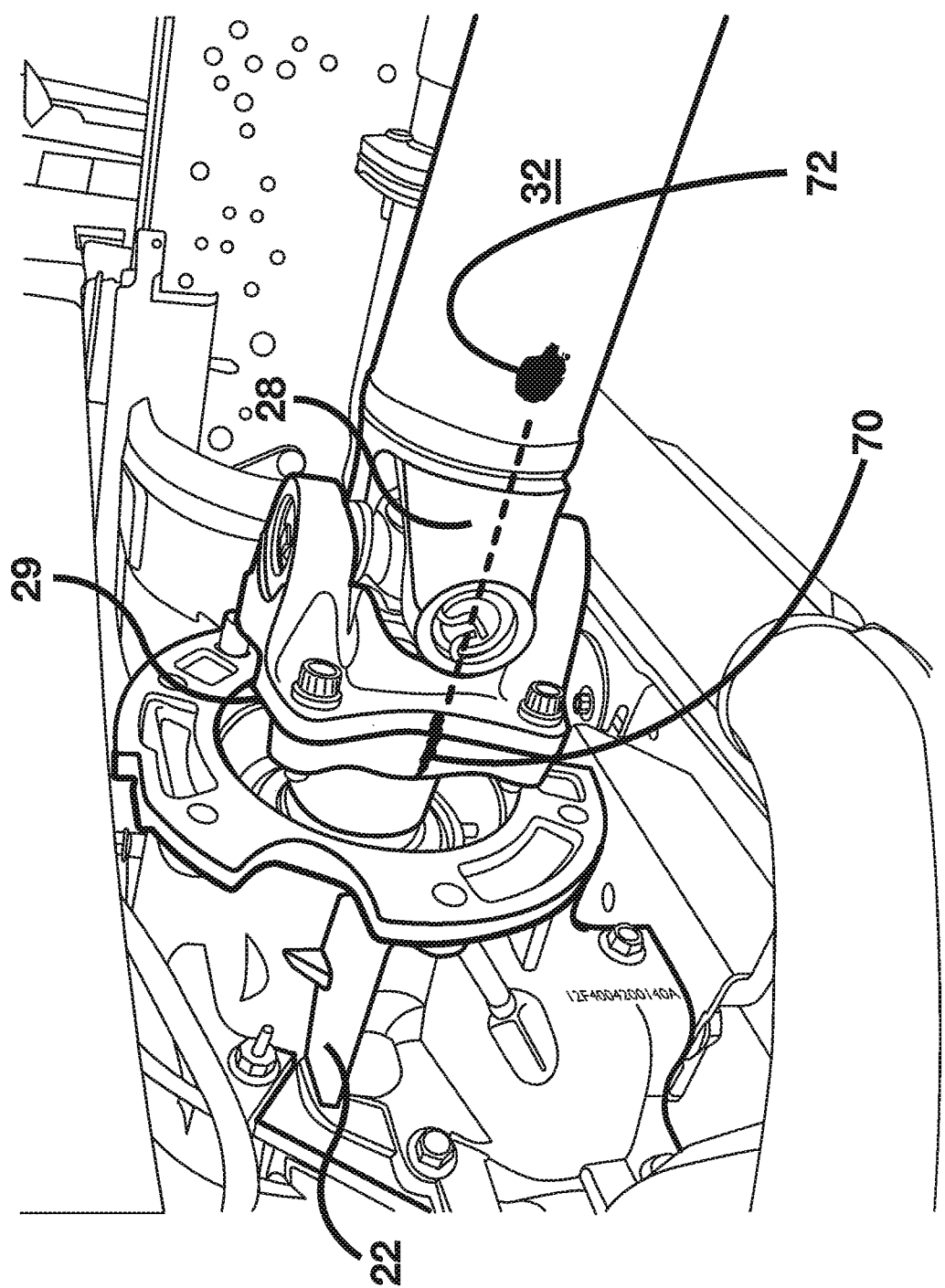
FIG. 8 shows an enlarged view of the universal joint connection between the front drive shaft segment and the transmission of the vehicle of FIG. 1, before the drive shaft is extended using the method and apparatus of the present invention.
Figure 9:
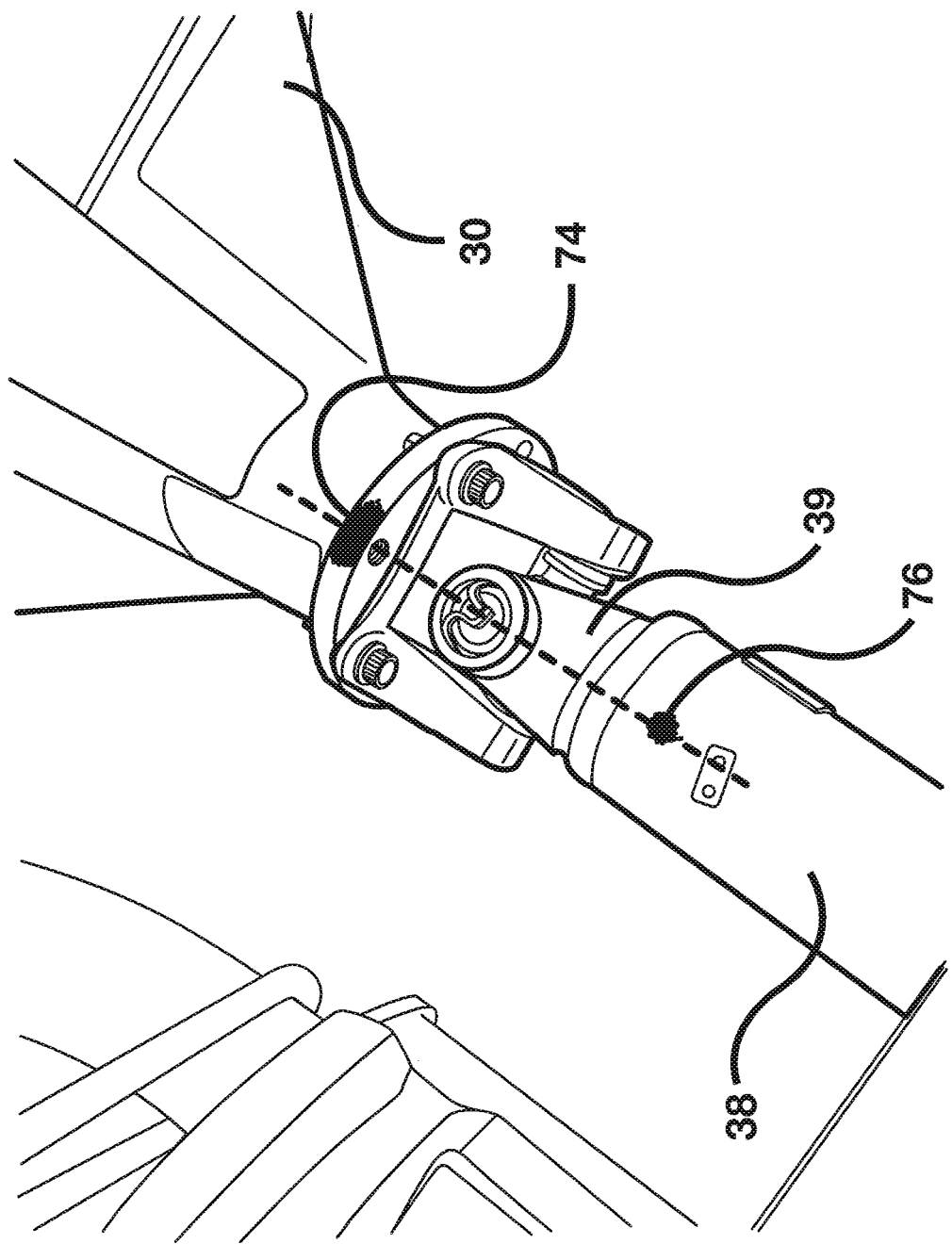
FIG. 9 shows an enlarged view of the universal joint connection between the rear drive shaft segment and the differential of the vehicle of FIG. 1, before the drive shaft is extended using the method and apparatus of the present invention.

Still referring to FIGS. 7-9, the drive shaft assembly 26 includes a first rigid shaft segment 32 extending from the rear of the transmission 22, and connected thereto by a front universal joint 28 having a flange 29 that is configured to connect to the transmission flange (see FIG. 8). The first shaft segment 32 also has a rear universal joint 36, as shown in FIG. 7. A center bearing assembly 37 is attached to the frame cross-member 24 and captures the first shaft segment 32 near its rear end 34. The center bearing assembly 37 permits rotation of the shaft while fixing the position of its rear end 34 relative to the frame. A rear drive shaft segment 38 is connected to the universal joint 36 and extends to the differential 30. As shown in FIG. 9, the rear drive shaft segment 38 is connected to the differential 30 via a third universal joint 39.

To extend the vehicle frame and drive shaft according to the present invention, the drive shaft assembly 26 is disengaged from the vehicle, including being disengaged from the transmission 22 (see FIG. 8) and from the differential 30 (see FIG. 9). To allow for proper alignment later when the drive shaft assembly 26 is reinstalled in the vehicle, the shaft segments and the transmission flange and differential flange are marked as shown in FIGS. 8 and 9 before the drive shaft assembly is disengaged. Referring to FIG. 8, this marking process includes making alignment markings 70 on the transmission flange and the universal joint flange 29 in line with a balance mark 72 on the first drive shaft segment 32. As shown in FIG. 9, the marking process also includes making an alignment marking 74 on the differential flange in line with a balance mark 76 on the rear drive shaft segment 38.

Figure 10:
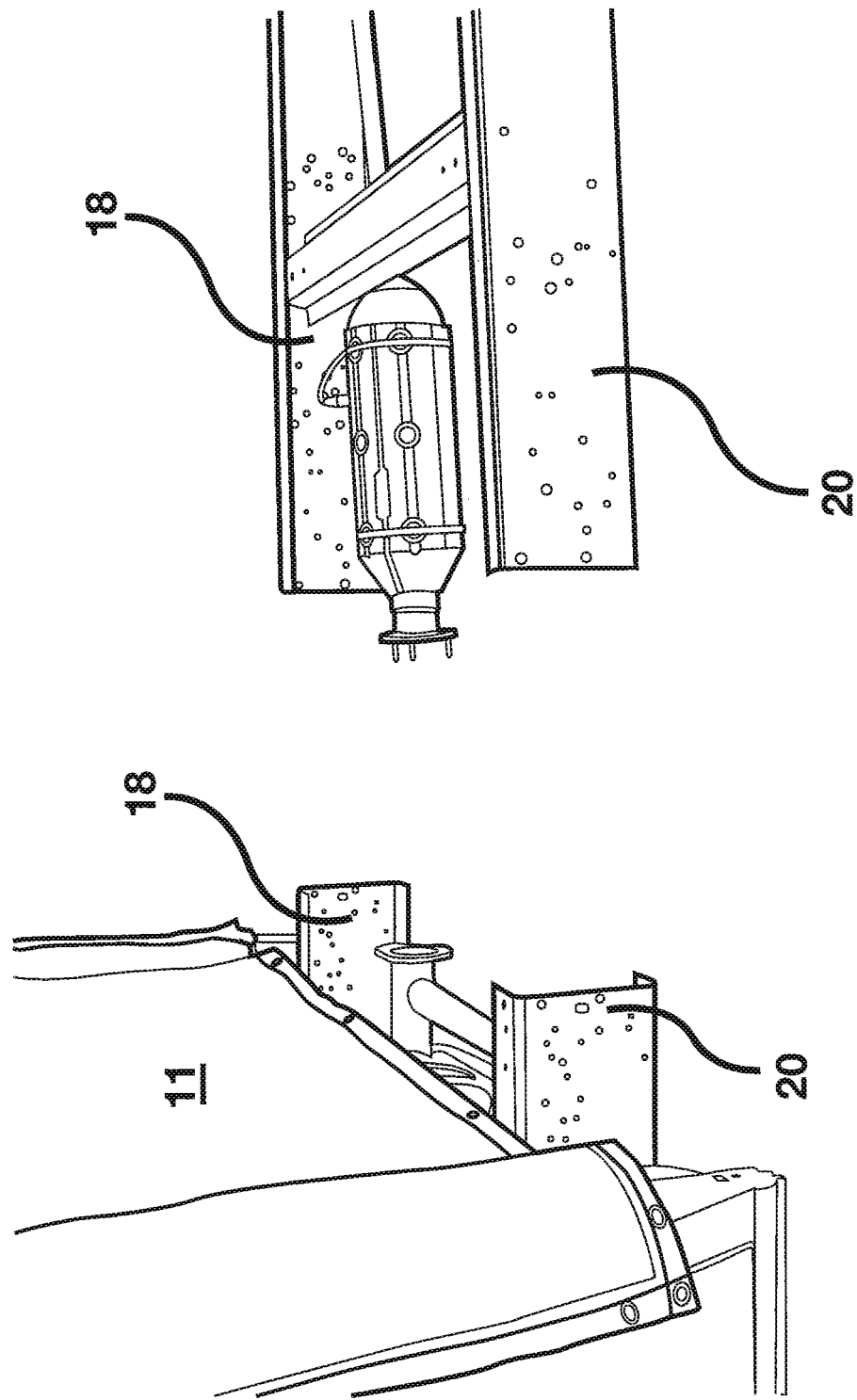
FIG. 10 shows the chassis frame of the vehicle of FIG. 1 with the drive shaft removed and frame rails cut during the process of extending the frame according to the present invention.
Figure 11:
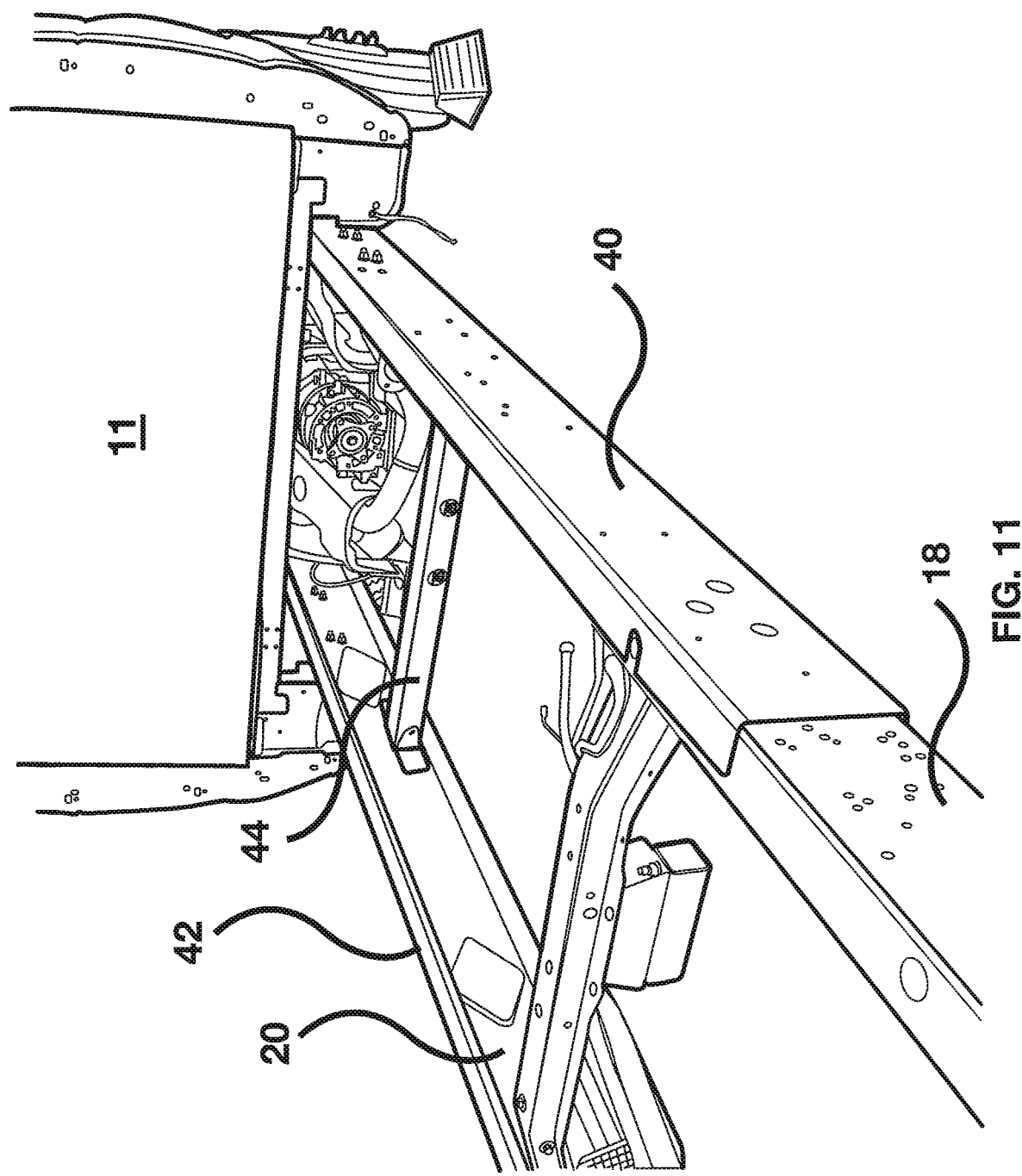
FIG. 11 shows the chassis frame with frame rail extensions welded into the vehicle during the process of extending the frame according to the present invention.
Figure 12:
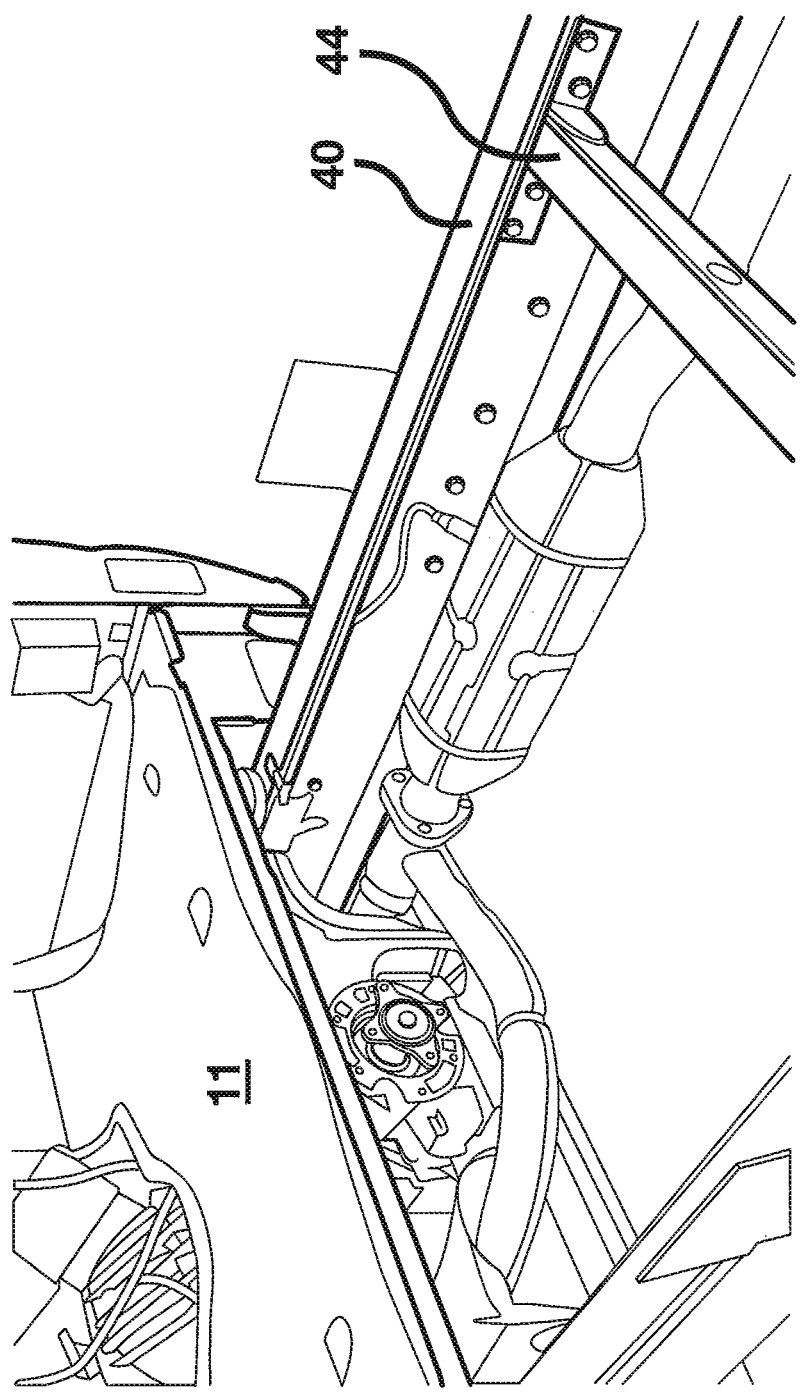
FIG. 12 shows an extension cross-member mounted between the frame rail extensions, with the exhaust system reinstalled during the process of extending the frame according to the present invention.
Figure 13:
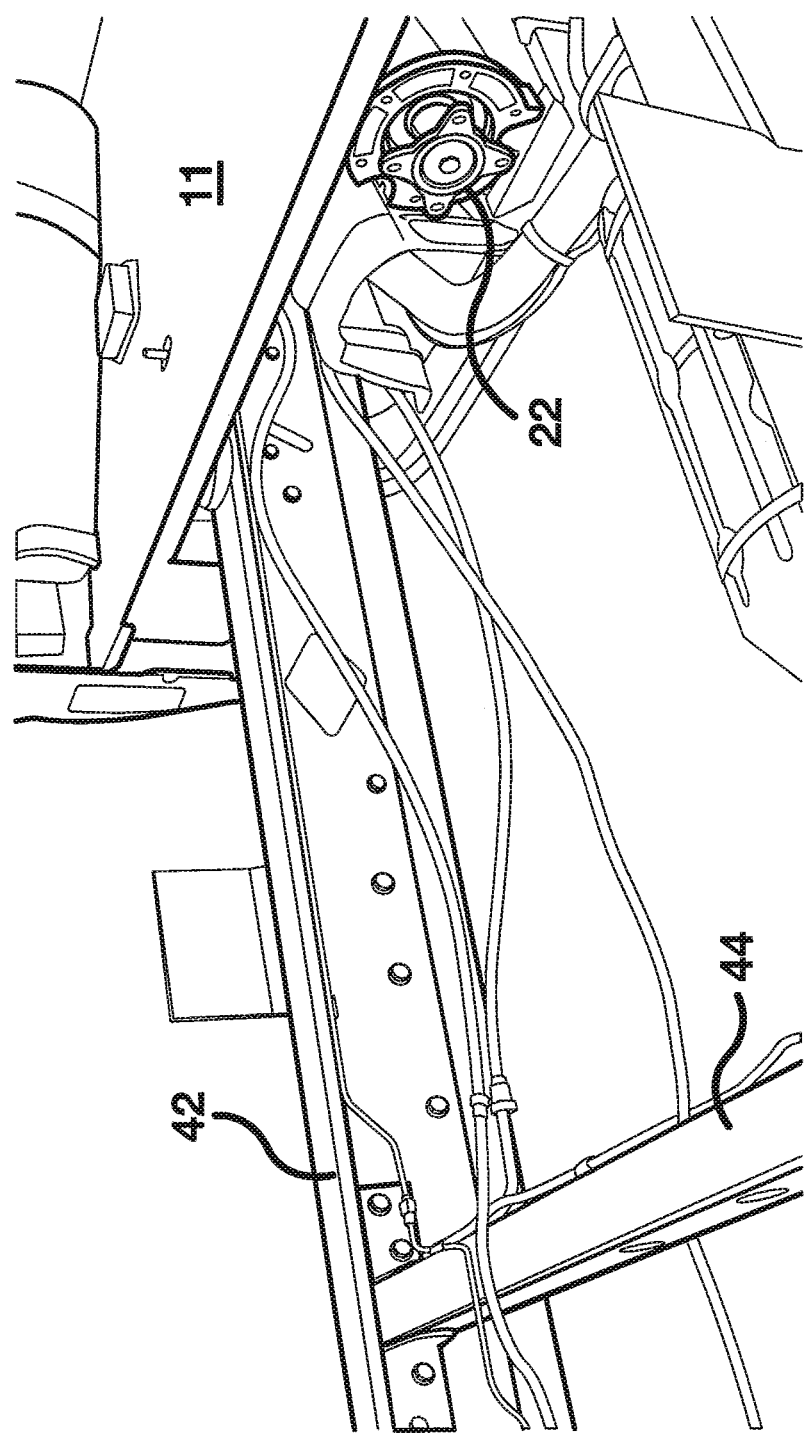
FIG. 13 shows another view of the extension cross-member of FIG. 12 with the drive shaft removed.

Referring to FIGS. 10-13, after making other necessary disconnections, including disconnecting the exhaust system and brake lines, the frame rails 18, 20 are cut at the location shown in FIG. 10 and frame rail extensions are welded to the frame rails 18, 20 in a manner known in the art. As shown in FIG. 11, in a preferred embodiment, frame rail extension reinforcements 40, 42 are mounted over the frame rail extensions and bolted to the frame rails 18, 20 and frame rail extensions. An extension cross-member 44 is mounted between the frame rail extensions using bolts (see FIGS. 12-13) for supporting an extension bearing assembly as discussed below. In one embodiment, the extension cross-member 44 is mounted between the frame rail extensions at an angle A as described below.

Figure 14:
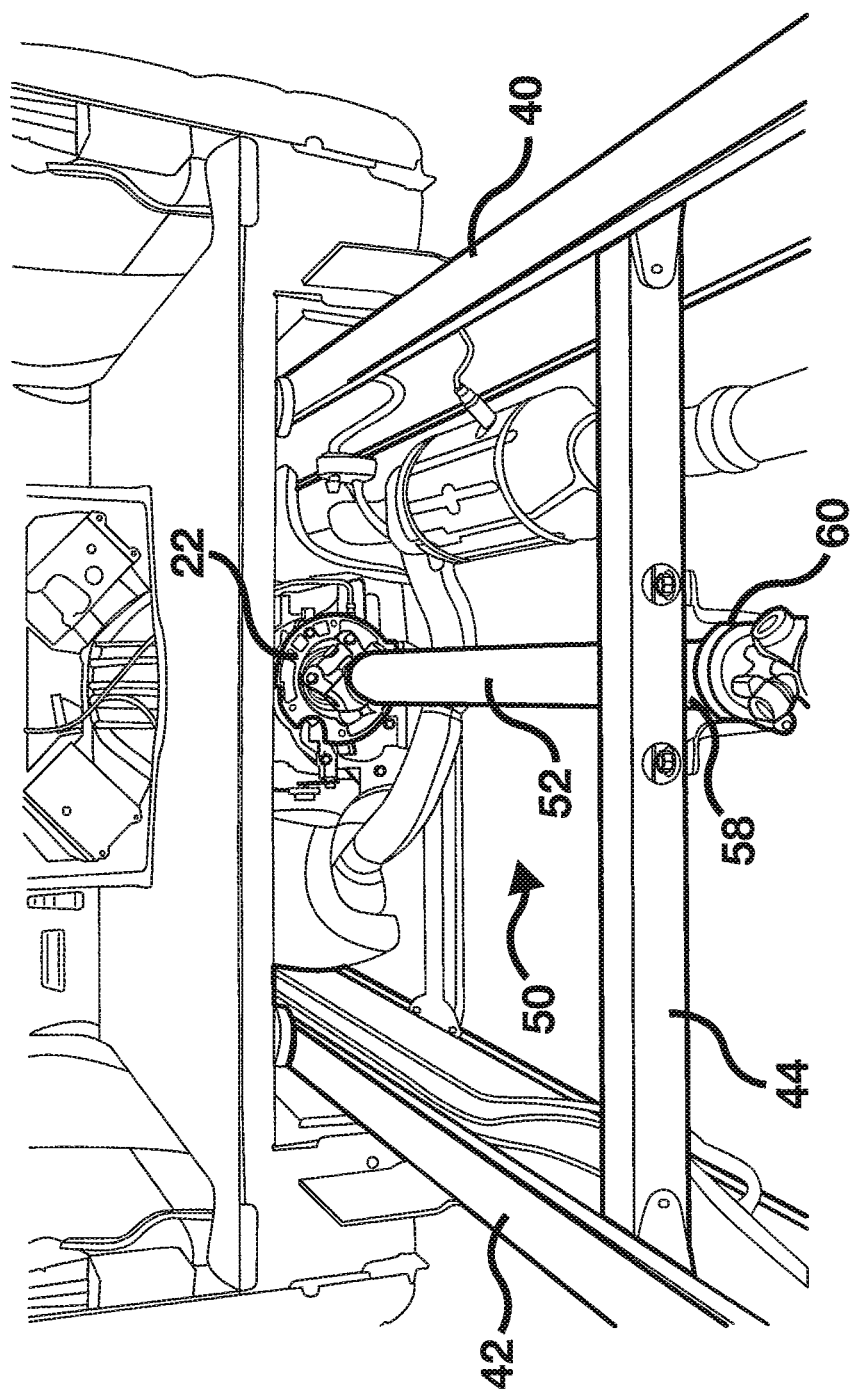
FIG. 14 shows a drive shaft extension segment mounted to the vehicle transmission and the extension cross-member according to the present invention.

Referring to FIGS. 3-6 and 14-15, a drive shaft extension segment 50 is provided for insertion in the drive line between the transmission 22 and the first shaft segment 32 to extend the length of the vehicle drive to correspond with the vehicle frame extension. The drive shaft extension segment 50 has a rigid tube shaft 52 that has a universal joint 54 mounted at the shaft front end, which terminates in a front flange 56 configured for mounting to the transmission 22. An extension bearing assembly 58 is mounted to the shaft extension segment 50 near a rear end, which terminates in a companion rear flange 60 configured for mounting to the front flange 29 of the first drive shaft segment 32. The extension bearing assembly 58 is adapted to be fixedly mounted to the extension cross-member 44, as shown in FIG. 14, and to permit rotation of the extension tube shaft 52 while fixing the position of the tube shaft 52 relative to the vehicle frame. The drive shaft extension segment 50 is balanced before being installed, and the extension tube shaft 52 is marked with balance marks at each end as is known in the art. In contrast to previous drive shaft extension methods, however, the combination of the drive shaft extension segment 50 and the original drive shaft assembly 26 need not be re-balanced as a unit before installation into the extended frame.

Figure 15:
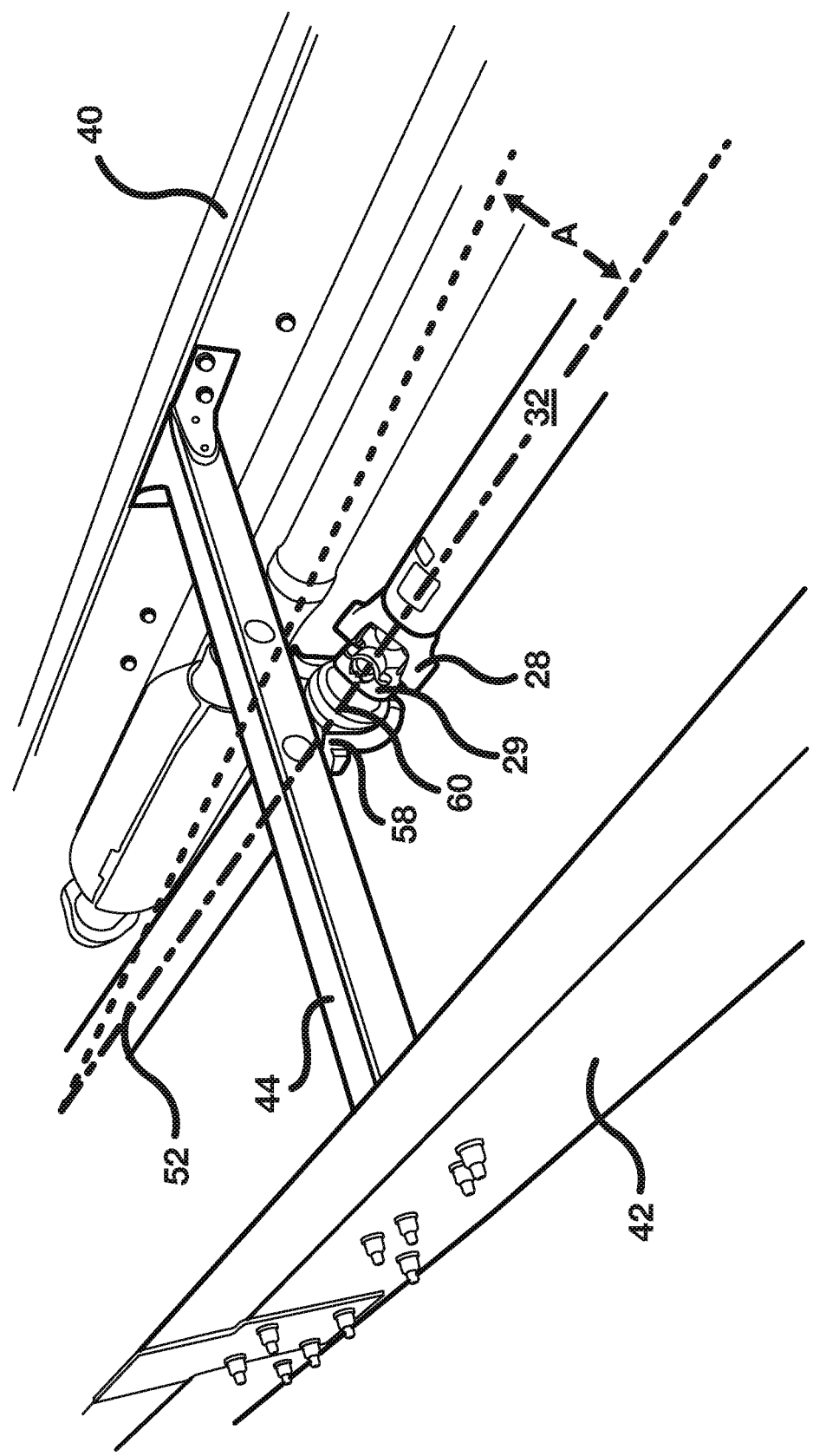
FIG. 15 shows the front segment of the drive shaft assembly of FIG. 7 reinstalled and connected to the drive shaft extension segment of FIG. 14
Figure 16:
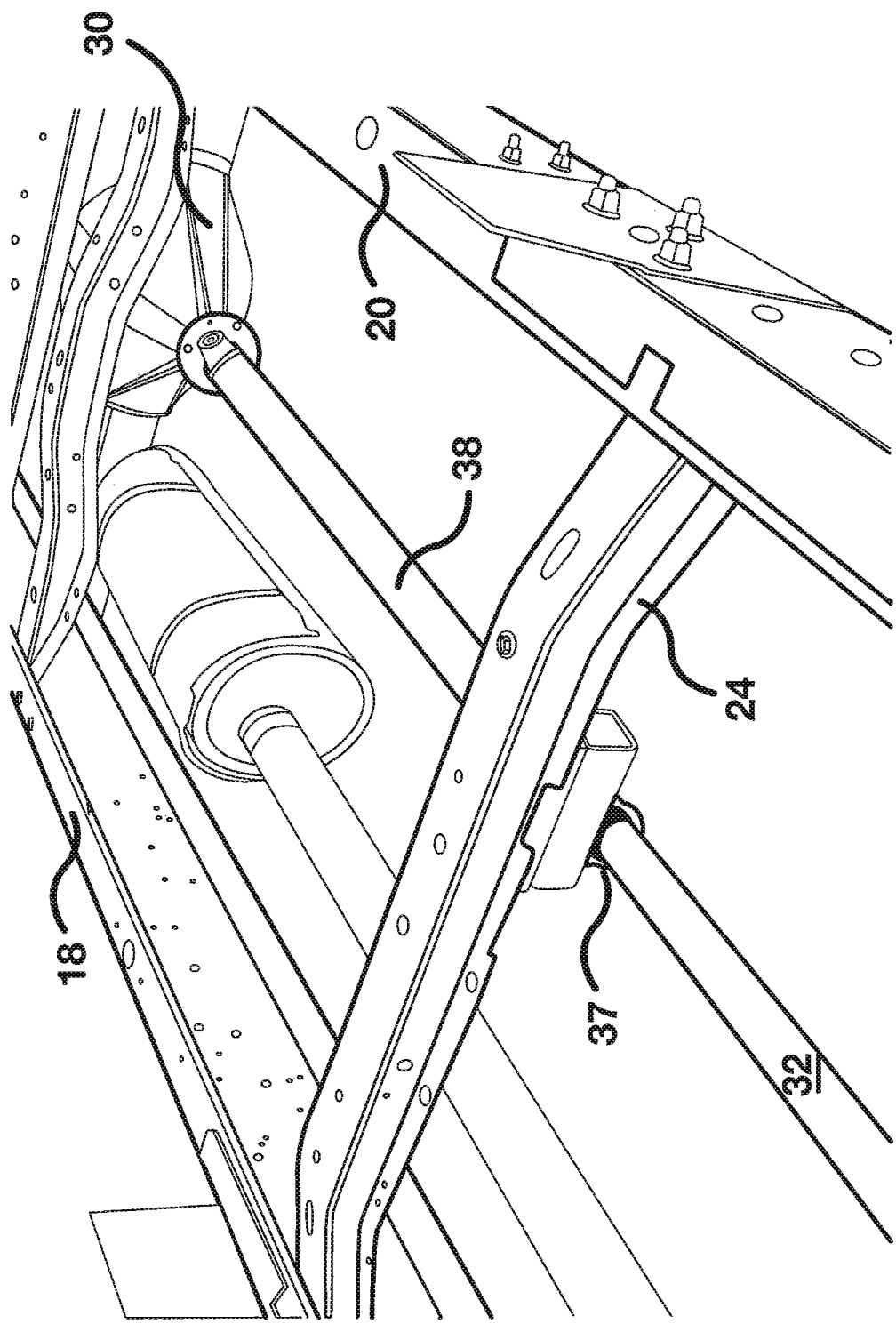
FIG. 16 shows another view of the front segment of the drive shaft assembly of FIG. 7 reinstalled and connected to the drive shaft extension segment of FIG. 14.
Figure 17:
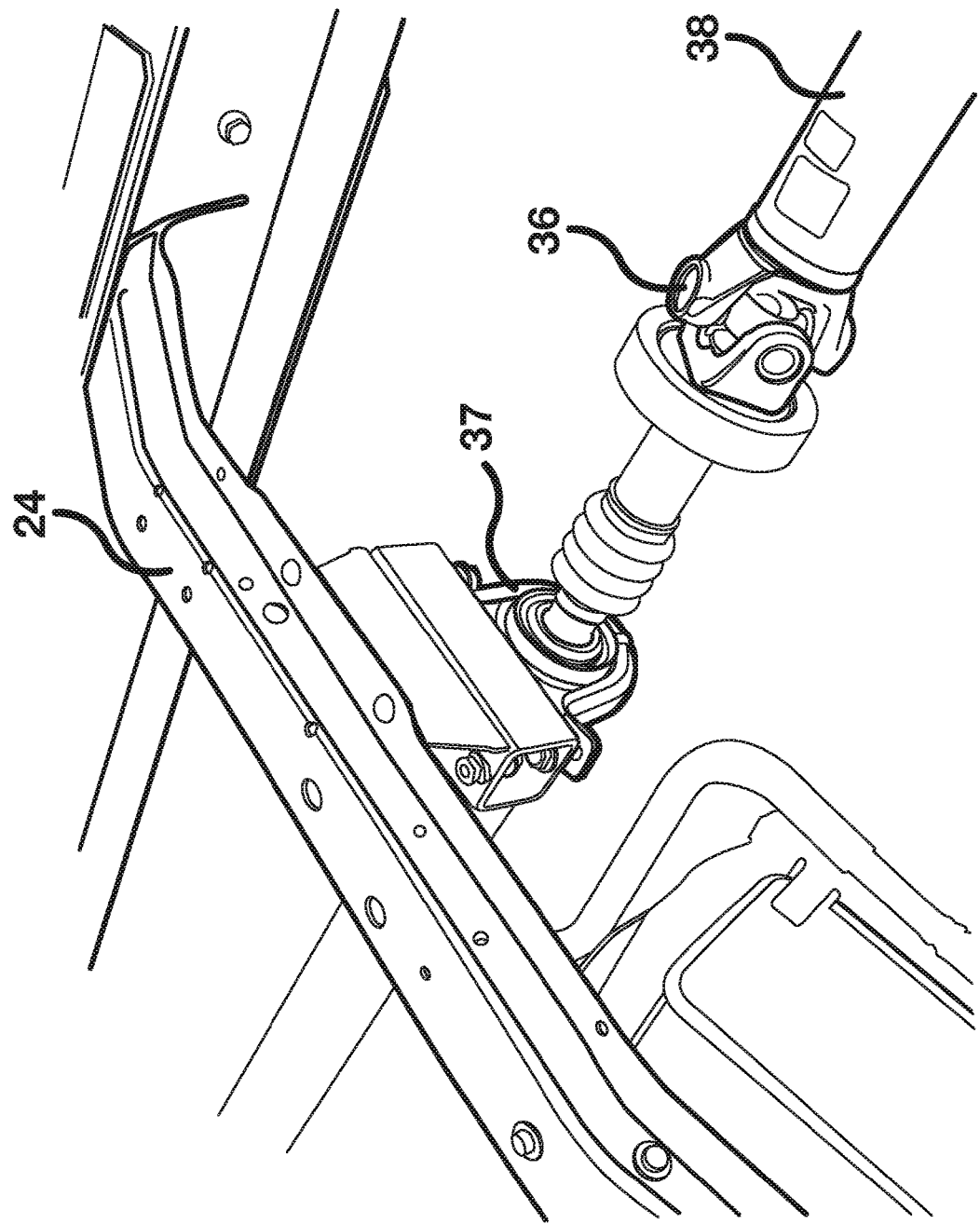
FIG. 17 shows another view of the front and rear drive shaft segments of the drive shaft assembly reinstalled into the vehicle.
Figure 18:
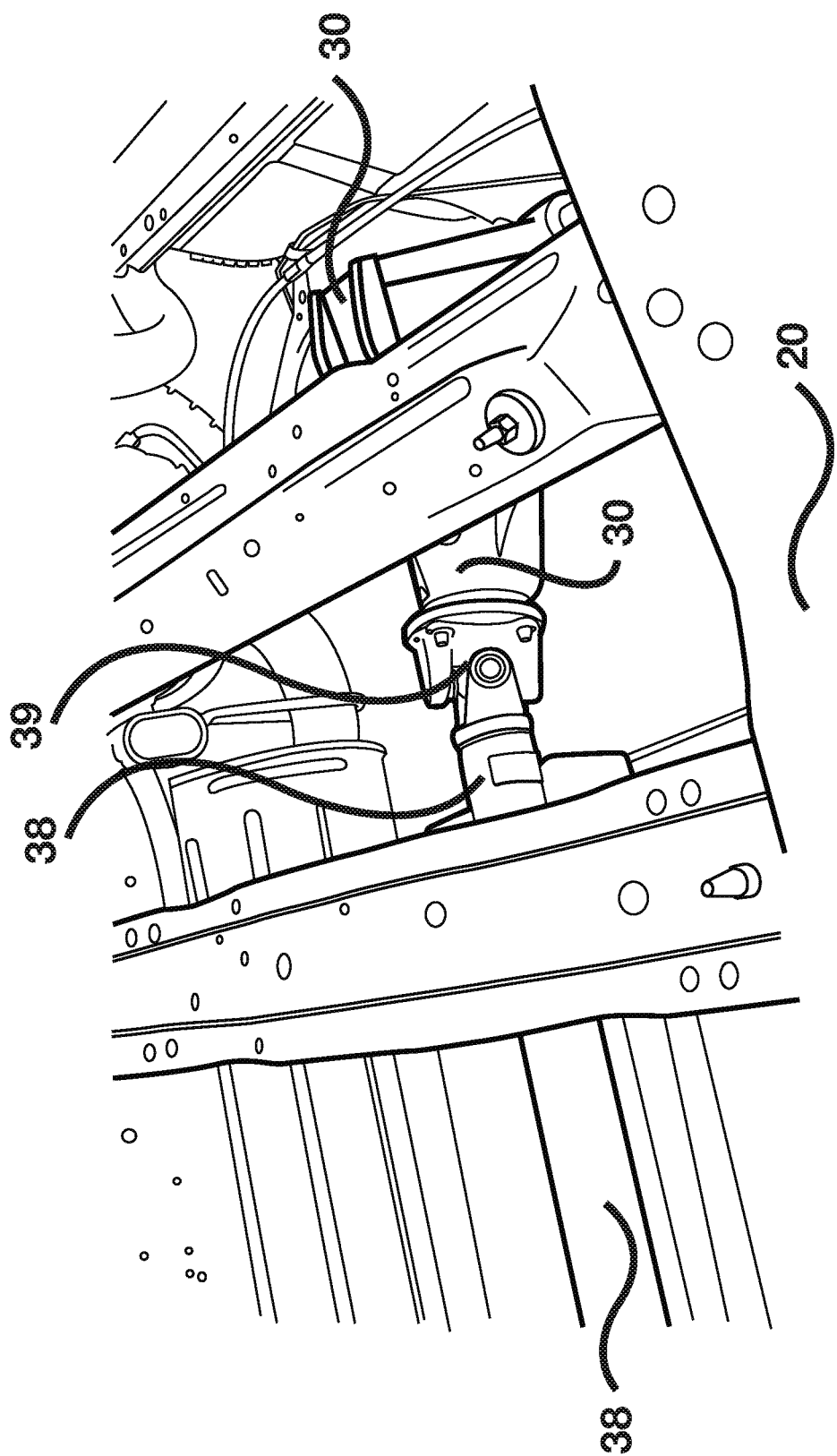
FIG. 18 shows the rear drive shaft segment reconnected to the vehicle differential after the drive shaft assembly is reinstalled and connected to the drive shaft extension segment of FIG. 17.

In one embodiment, the extension cross-member 44 is mounted between the frame rail extensions at an angle A with respect to the frame rails so that the extension bearing assembly 58 holds the extension tube shaft 52 with its center axis in a generally straight alignment with the center axis of the drive shaft segment 32, as shown in FIG. 15. This configuration reduces wear on the drive shaft.

Referring to FIGS. 15-18, after the drive shaft extension segment 50 is mounted to the transmission 22 and the extension cross-member 44, the previously-removed drive shaft assembly 26 is re-installed between the drive shaft extension segment 50 and the differential 30. Advantageously, and unlike previously known drive shaft extension methods, using the alignment marks described above, this can be done without having to rebalance the drive shaft assembly 26.

Figure 2:
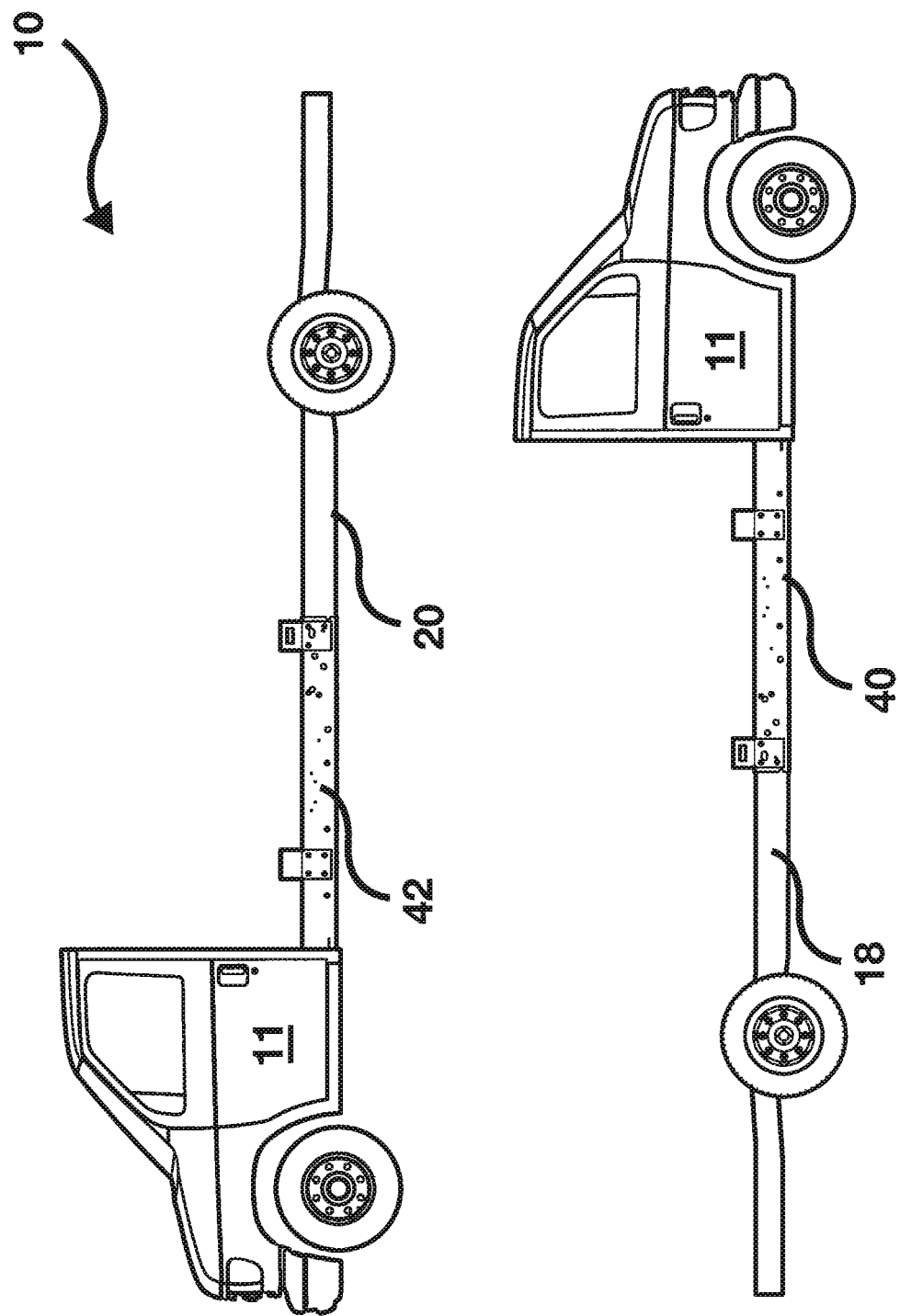
FIG. 2 shows left and right side elevation views of the Ford E450 truck of FIG. 1 after its chassis has been extended using the method and apparatus of the present invention.
Figure 3:
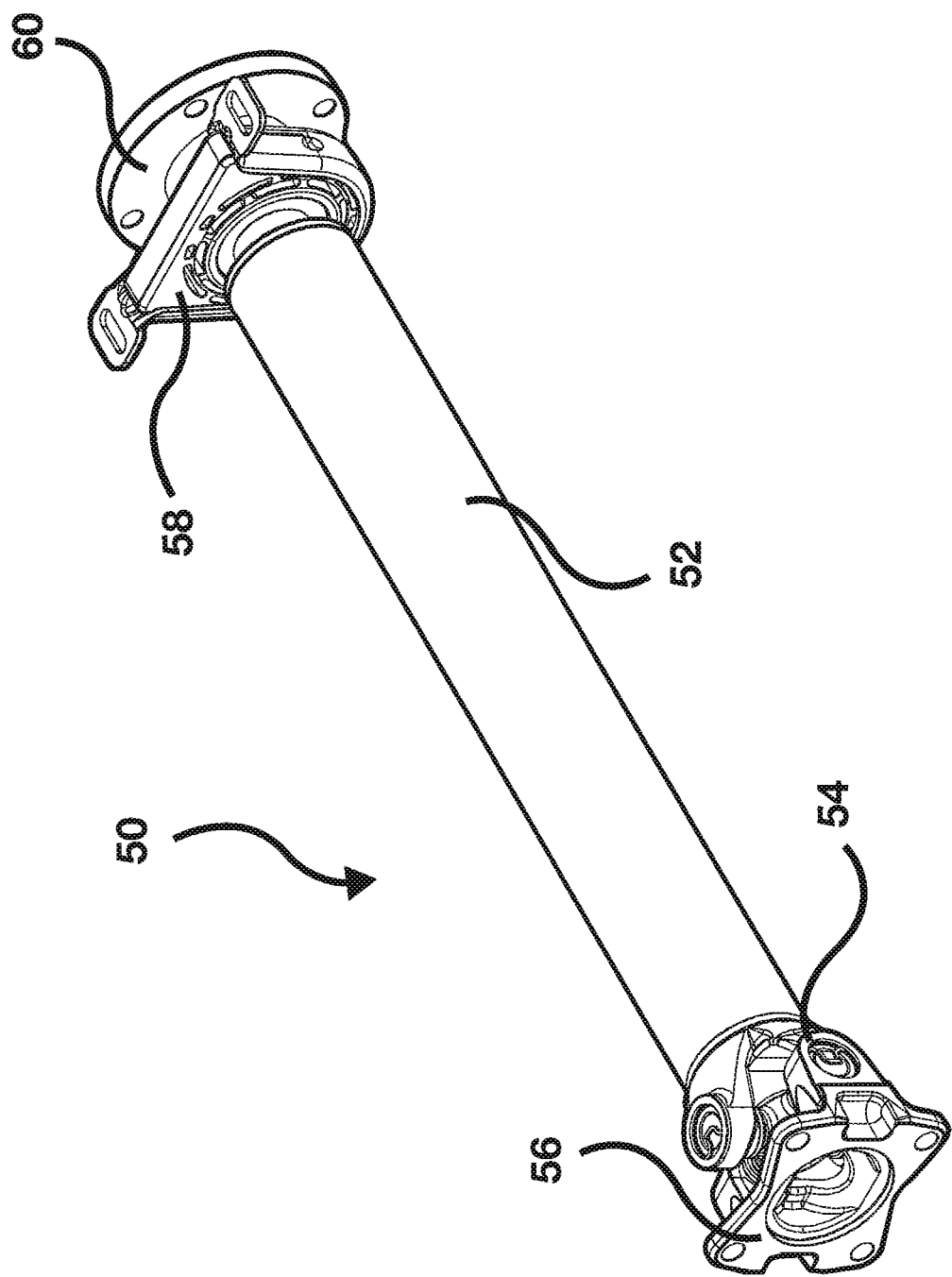
FIG. 3 is a perspective view of a drive shaft extension assembly according to the present invention for lengthening a vehicle drive shaft.

The method and apparatus of the present invention has been used to extend the vehicle chassis and drive shaft of a Ford E450 truck. Before being extended, the truck chassis had a 158-inch wheel base (see FIG. 1). Using the method and apparatus of the present invention, the chassis and drive shaft are extended approximately 44 inches (see FIG. 2).

According to one presently preferred embodiment, the drive shaft assembly 26 includes a rear drive shaft segment 38 that has a non-standard, enlarged shaft diameter. For example, the standard rear drive shaft segment 38 provided by Ford on an E450 truck has an approximate 2½ inch diameter, whereas the rear drive shaft segment of the E450 truck to be extended has a larger diameter, i.e. a diameter in the range of about 3 to 3½ inches. This increased diameter helps to reduce the problem of runout tolerance and thereby helps to eliminate the need to rebalance the drive shaft assembly after it is assembled with the drive shaft extension segment 50. In one embodiment, the drive shaft extension 50 also can have an enlarged shaft diameter. For example, the drive shaft extension can have a diameter in a range from about 3 to 3½ inches.

Having read this disclosure, it will also be understood by those having skill in the art that the method and apparatus of the present invention enjoy a number of advantages over the prior art. For example, they can be used to extend the length of a vehicle chassis and corresponding drive shaft without the need to rebalance the extended drive shaft assembly, thereby saving time, labor and expense.

It will also be understood by those having skill in the art that modifications may be made to the invention without departing from its spirit and scope. Therefore, the invention in its broader aspects is not limited to the specific details, representative devices, and illustrative examples shown and described. Accordingly, departures may be made from such details without departing from the spirit or scope of the general inventive concept.

What is claimed is:

1. A drive shaft extension segment for installation into a vehicle to be extended in length, the drive shaft extension segment comprising:
a rigid tubular shaft rotatable about a longitudinal axis and having a front end and a rear end; and
a universal joint mounted at the tubular shaft front end and having a front flange configured for mounting to a transmission;
wherein the tubular shaft rear end includes a rearward facing flange configured for mounting to a forward facing flange of a drive assembly that has been disengaged from a transmission of the vehicle to be extended in length;
wherein the drive shaft extension segment has been balanced separately from the drive assembly before installing the drive shaft extension segment into the vehicle;
wherein the drive shaft extension segment is configured for installation between the vehicle transmission and the forward facing flange of the drive assembly and for operation in the vehicle without rebalancing the drive assembly; and
wherein the drive shaft extension segment includes mounting means for mounting the drive shaft extension segment to an extension cross-member extending between frame rail extensions, and wherein the mounting means consists of a bearing assembly mounted to the tubular shaft between the shaft front end and rear end.

2. The drive shaft extension segment of claim 1 wherein the drive assembly includes a segment having a shaft diameter that is larger than a diameter of the rear end of the drive shaft extension tubular shaft.

3. The drive shaft extension segment of claim 1 wherein the vehicle to be extended in length has an original wheel base of about 158 inches and the drive shaft extension segment has a length of about 44 inches.

4. The drive shaft extension segment of claim 3 wherein the drive assembly includes a segment having a shaft diameter in a range of between about 3 inches to about 3 ½ inches.

5. The drive shaft extension segment of claim 1 wherein the drive shaft extension segment is mounted to the extension cross-member so that the longitudinal axis of the extension segment tubular shaft is in a generally straight alignment with a longitudinal axis of the drive assembly when the drive shaft extension segment is mounted to the drive assembly.

6. An extended drive assembly in a vehicle previously having an original drive assembly, wherein the original drive assembly has a front drive shaft segment coupled to a transmission of the vehicle and a rear drive shaft segment coupled to a rear differential assembly of the vehicle, the extended drive assembly comprising:
a drive shaft extension segment comprising:
a rigid tubular shaft rotatable about a longitudinal axis and having a front end and a rear end;
a universal joint mounted at the tubular shaft front end and having a front flange configured for mounting to the transmission; and
a bearing assembly mounted to the tubular shaft between the front end and the rear end;
wherein the tubular shaft rear end includes a rearward facing flange configured for mounting to a forward facing flange of the front drive shaft segment;
wherein the drive shaft extension segment is installed into the vehicle between the vehicle transmission and the front drive shaft segment without rebalancing the original drive assembly;
wherein the drive shaft extension segment has been balanced before installing it into the vehicle; and
wherein the original drive assembly was balanced before it was installed into the vehicle.

7. The extended drive assembly of claim 6 further wherein the rearward facing flange of the drive shaft extension segment is mounted to the forward facing flange of the front drive shaft segment.

8. The extended drive assembly of claim 6 further comprising an extension cross-member mounted to an extended vehicle frame, wherein the extension cross member is configured to support the drive shaft extension segment so that the longitudinal axis of the extension segment tubular shaft is in a generally straight alignment with a longitudinal axis of the front drive shaft segment.

9. The extended drive assembly of claim 6 wherein the rear drive shaft segment of the original drive assembly has a shaft diameter that is larger than a diameter of the drive shaft extension tubular shaft.

10. The extended drive assembly of claim 6 wherein the vehicle has an original wheel base of about 158 inches and the drive shaft extension segment has a length of about 44 inches.

11. The extended drive assembly of claim 10 wherein the original drive assembly includes a rear drive shaft segment having a shaft diameter in a range of between about 3 inches to about 3 ½ inches.

12. A drive shaft extension segment for installation into a vehicle to be extended in length and having an original drive assembly, the drive shaft extension segment comprising:
   a rigid tubular shaft rotatable about a longitudinal axis and having a front end and a rear end; and
   a universal joint mounted at the tubular shaft front end and having a front flange configured for mounting to a transmission;
   wherein the tubular shaft rear end includes a rearward facing flange configured for mounting to a forward facing flange of the original drive assembly that has been disengaged from a transmission of the vehicle to be extended in length;
   wherein the original drive assembly consists essentially of a drive shaft rigid shaft segment, front universal joint, and a rear universal joint;
   wherein the drive shaft extension segment is balanced separately from the original drive assembly before installing the drive shaft extension segment into the vehicle;
   wherein the drive shaft extension segment is configured for installation between the vehicle transmission and the forward facing flange of the original drive assembly to form an extended drive assembly for operation in the vehicle without rebalancing the original drive assembly; and
   wherein the rear end of the drive shaft extension segment is configured to be mounted to a vehicle frame assembly consisting essentially of an extension cross-member extending between frame rail extension reinforcements, each of ;which is mounted to a frame rail of the original vehicle frame.

13. A drive shaft extension segment for installation into a vehicle to be extended in length, the drive shaft extension segment comprising:
   a rigid tubular shaft rotatable about a longitudinal axis and having a front end and a rear end; and
   a universal joint mounted at the tubular shaft front end and having a front flange configured for mounting to a transmission;
   wherein the tubular shaft rear end includes a rearward facing flange configured for mounting to a forward facing flange of a drive assembly that has been disengaged from a transmission of the vehicle to be extended in length;
   wherein the drive shaft extension segment has been balanced separately from the drive assembly before installing the drive shaft extension segment into the vehicle;
   wherein the drive shaft extension segment is configured for installation between the vehicle transmission and the forward facing flange of the drive assembly and for operation in the vehicle without rebalancing the drive assembly; and
   wherein the drive shaft extension segment includes mounting means for mounting the drive shaft extension segment to an extension cross-member extending between frame rail extensions, and wherein the mounting means consists essentially of a bearing assembly mounted to the tubular shaft between the shaft front end and rear end.

14. The drive shaft extension segment of claim 13 wherein the drive assembly includes a segment having a shaft diameter that is larger than a diameter of the rear end of the drive shaft extension tubular shaft.

15. The drive shaft extension segment of claim 13 wherein the vehicle to be extended in length has an original wheel base of about 158 inches and the drive shaft extension segment has a length of about 44 inches.

16. The drive shaft extension segment of claim 15 wherein the drive assembly includes a segment having a shaft diameter in a range of between about 3 inches to about 3 ½ inches.

17. The drive shaft extension segment of claim 13 wherein the drive shaft extension segment is mounted to the extension cross-member configured to support the drive shaft extension segment so that the longitudinal axis of the extension segment tubular shaft is in a generally straight alignment with a longitudinal axis of the drive assembly when the drive shaft extension segment is mounted to the drive assembly.

* * * * *